United States Patent
Lee et al.

(10) Patent No.: US 11,760,055 B2
(45) Date of Patent: Sep. 19, 2023

(54) STITCHBONDED, WASHABLE NONWOVEN TOWELS AND METHOD FOR MAKING

(71) Applicant: AMTEX INNOVATIONS LLC, West Chester, OH (US)

(72) Inventors: Maxwell James Lee, Maineville, OH (US); Robert Charles Busch, Covington, KY (US)

(73) Assignee: AMTEX INNOVATIONS LLC, West Chester, OH (US)

( * ) Notice: Subject to any disclaimer, the term of this patent is extended or adjusted under 35 U.S.C. 154(b) by 74 days.

(21) Appl. No.: 16/821,633

(22) Filed: Mar. 17, 2020

(65) Prior Publication Data

US 2020/0215789 A1 Jul. 9, 2020
US 2021/0229396 A9 Jul. 29, 2021

Related U.S. Application Data

(62) Division of application No. 16/383,047, filed on Apr. 12, 2019, now Pat. No. 11,220,086.
(Continued)

(51) Int. Cl.
*B32B 5/06* (2006.01)
*B32B 5/26* (2006.01)
(Continued)

(52) U.S. Cl.
CPC ............. *B32B 5/06* (2013.01); *B32B 5/022* (2013.01); *B32B 5/26* (2013.01); *B32B 37/18* (2013.01);
(Continued)

(58) Field of Classification Search
CPC ............. Y10T 442/663; Y10T 442/682; Y10T 442/689; Y10T 442/662; B32B 5/26;
(Continued)

(56) References Cited

U.S. PATENT DOCUMENTS

| 3,332,882 A | 7/1967 | Blumbergs et al. |
| 3,416,952 A | 12/1968 | McIntyre et al. |

(Continued)

FOREIGN PATENT DOCUMENTS

| CA | 989557 | 5/1976 |
| EP | 0476193 A1 | 3/1992 |

(Continued)

OTHER PUBLICATIONS

International Preliminary Report on Patentability dated Oct. 13, 2020 in related International Application No. PCT/US2019/027283 filed Apr. 12, 2019 (7 pages).

(Continued)

*Primary Examiner* — Jeremy R Pierce
*Assistant Examiner* — Christine X Nisula
(74) *Attorney, Agent, or Firm* — Daniel F. Nesbitt; Nesbitt IP LLC

(57) ABSTRACT

A stitchbonded washable towel made from a stitchbonded fabric having a cellulosic nonwoven sheet of cellulosic fibers, and an integrated nonwoven sheet of an outer sublayer of wood pulp fibers, and an inner layer of textile fibers substantially entangled with the wood pulp fibers, and confronting the cellulosic nonwoven sheet of cellulosic fibers. The stitchbonded fabric as uses a pattern of stitching yarns that fixes the cellulosic nonwoven sheet to the integrated nonwoven sheet. A post-treatment of the stitchbonded fabric in a heated aqueous solution containing soil release polymer gathers the fabric into the towel, and provides stain and soil re-deposition resistance.

14 Claims, 2 Drawing Sheets

Related U.S. Application Data

(60) Provisional application No. 62/657,418, filed on Apr. 13, 2018.

(51) Int. Cl.
  *B32B 37/18* (2006.01)
  *B32B 5/02* (2006.01)
  *D04B 21/16* (2006.01)

(52) U.S. Cl.
  CPC ........ *D04B 21/165* (2013.01); *B32B 2262/04* (2013.01); *B32B 2262/067* (2013.01)

(58) Field of Classification Search
  CPC ........ B32B 5/06; D04H 1/4374; D04H 1/498; D04H 1/465; D04H 1/46; D04H 1/49; D04H 1/492; D04H 1/52; D04H 1/10; D04H 1/28; D04H 1/4258; D04B 21/165
  USPC .................. 442/383–384; 428/373, 387–388
  See application file for complete search history.

(56) References Cited

U.S. PATENT DOCUMENTS

| | | |
|---|---|---|
| 3,625,754 A | 12/1971 | Dunn |
| 3,649,165 A | 3/1972 | Cotton |
| 3,660,010 A | 5/1972 | Georgoudis et al. |
| 3,676,052 A | 7/1972 | Harper et al. |
| 3,782,898 A | 1/1974 | Mandell |
| 3,981,807 A | 9/1976 | Raynolds |
| 4,007,305 A | 2/1977 | Kakar et al. |
| 4,014,857 A | 3/1977 | Schmoyer |
| 4,018,646 A | 4/1977 | Ruffo et al. |
| 4,068,035 A | 1/1978 | Violland et al. |
| 4,073,993 A | 2/1978 | Lark |
| 4,128,494 A | 12/1978 | Schirmann et al. |
| 4,207,071 A | 6/1980 | Lipowitz et al. |
| 4,290,765 A | 9/1981 | Sandler |
| 4,427,557 A | 1/1984 | Stockburger |
| 4,675,226 A | 6/1987 | Ott |
| 4,704,321 A | 11/1987 | Zafiroglu |
| 4,737,394 A | 4/1988 | Zafiroglu |
| 4,740,326 A | 4/1988 | Hortel et al. |
| 4,751,015 A | 6/1988 | Humphreys et al. |
| 4,773,238 A | 9/1988 | Zafiroglu |
| 4,818,426 A | 4/1989 | Humphreys et al. |
| 4,876,128 A | 10/1989 | Zafiroglu |
| 4,891,957 A | 1/1990 | Strack et al. |
| 4,937,277 A | 6/1990 | O'Lenick |
| 5,085,914 A | 2/1992 | Perdelwitz, Jr. et al. |
| 5,098,764 A | 3/1992 | Drelich et al. |
| 5,308,673 A | 5/1994 | Tochacek et al. |
| 5,308,674 A | 5/1994 | Zafiroglu |
| 5,879,779 A | 3/1999 | Zafiroglu |
| 5,895,623 A | 4/1999 | Trokhan et al. |
| 5,902,757 A | 5/1999 | Stern et al. |
| 6,200,351 B1 | 3/2001 | Schleinig et al. |
| 6,381,817 B1 | 5/2002 | Moody, III |
| 6,407,018 B1 | 6/2002 | Zafiroglu |
| 6,516,502 B1 | 2/2003 | Moody, III |
| 6,770,581 B1 | 8/2004 | DeMott et al. |
| 6,794,352 B2 | 9/2004 | Svendsen |
| 6,821,601 B2 | 11/2004 | Tsiarkezos et al. |
| 7,012,033 B2 | 3/2006 | Hayes et al. |
| 7,112,621 B2 | 9/2006 | Rohrbaugh et al. |
| 8,148,279 B2 | 4/2012 | Anantharamaiah et al. |
| 8,900,328 B2 | 12/2014 | De Buzzaccarini et al. |
| 9,394,637 B2 | 7/2016 | Knowlson et al. |
| 9,433,154 B2 | 9/2016 | Benim et al. |
| 9,770,153 B2 | 9/2017 | Sears |
| 9,828,571 B2 | 11/2017 | Britton |
| 9,890,350 B2 | 2/2018 | Lundberg et al. |
| 2002/0019508 A1* | 2/2002 | Branum .................. D03D 15/49 525/437 |
| 2002/0034903 A1* | 3/2002 | Shoemaker ............... D01F 6/60 442/85 |
| 2003/0143263 A1 | 7/2003 | Durden et al. |
| 2004/0224133 A1 | 11/2004 | Pourdeyhimi et al. |
| 2005/0069672 A1 | 3/2005 | Katsin |
| 2005/0112975 A1 | 5/2005 | McMurray |
| 2007/0270071 A1 | 11/2007 | Greer et al. |
| 2008/0166520 A1 | 7/2008 | Zafiroglu et al. |
| 2010/0203306 A1 | 8/2010 | Fingal et al. |
| 2011/0146017 A1 | 6/2011 | Wildeman |
| 2011/0177296 A1 | 7/2011 | Maranghi |
| 2013/0273297 A1 | 10/2013 | Zafiroglu |
| 2014/0170402 A1 | 6/2014 | Knowlson et al. |
| 2014/0242324 A1* | 8/2014 | Jones ..................... D04H 1/495 428/152 |
| 2016/0040337 A1 | 2/2016 | Dutkiewicz et al. |
| 2016/0228337 A1 | 8/2016 | Knowlson et al. |
| 2017/0121650 A1 | 5/2017 | Lundberg et al. |
| 2017/0203542 A1 | 7/2017 | Ramaratnam et al. |
| 2018/0251925 A1 | 9/2018 | Knowlson et al. |
| 2018/0326699 A1 | 11/2018 | Knowlson et al. |

FOREIGN PATENT DOCUMENTS

| | | |
|---|---|---|
| EP | 0928583 B1 | 7/1999 |
| WO | 9110719 | 7/1991 |
| WO | 9419523 A1 | 9/1994 |
| WO | 9630571 A1 | 10/1996 |
| WO | 2013077980 A2 | 5/2013 |
| WO | 2014092806 A1 | 6/2014 |
| WO | 2017124092 A1 | 7/2017 |
| WO | 2018212904 A1 | 11/2018 |
| WO | 2019069283 A1 | 4/2019 |

OTHER PUBLICATIONS

Saeed Ajeli, Zoleykhah Ahmadvand, Investigation of the Two-Bar Warp-Knitted Fabric Structure Effect on Luster Value, Journal of Engineered Fibers and Fabrics, 2014, pp. 32-37, vol. 9, Issue 2, Isfahan, Iran. (6 pages).

International Search Report and Written Opinion dated Jul. 4, 2019 by the European Patent Office (as International Searching Authority), for related International Application No. PCT/US2019/027283, filed Apr. 12, 2019 (10 pages).

Bueno et al., "Chapter 3—Structure and Mechanics of Knitted Fabrics", Structure and Mechanics of Textile Fibre Assemblies by Peter Schwartz, $2^{nd}$ ed., Aug. 15, 2019 (47 pages).

International Search Report and Written Opinion dated Sep. 6, 2019 by the European Patent Office (as International Searching Authority), for co-pending International Application No. PCT/US2019/034915, filed May 31, 2019 (12 pages).

U.S. Appl. No. 16/383,047, filed Apr. 12, 2019, LEE et al.
U.S. Appl. No. 16/439,992, filed Jun. 13, 2019, Busch et al.
Non-final Office Action dated Mar. 18, 2021 in copending U.S. Appl. No. 16/383,047, filed Apr. 12, 2019 (23 pages).

* cited by examiner

STITCHBONDED, WASHABLE NONWOVEN TOWELS AND METHOD FOR MAKING

CROSS-REFERENCE TO RELATED APPLICATIONS

This application is a divisional of U.S. application Ser. No. 16/383,047, filed Apr. 12, 2019, which claims the benefit of U.S. Provisional Application No. 62/657,418, filed Apr. 13, 2018, the disclosures of which are incorporated herein by reference.

BACKGROUND OF THE INVENTION

Stitchbonded nonwoven fabric is made by multi-needle stitching of a fibrous layer with one or more stitching thread systems to form patterns of stitches in the layer. Known processes for making a stitchbonded nonwoven fabric typically include the steps of (a) feeding a fibrous layer to a stitchbonding machine; (b) threading a multi-needle bar of the stitchbonding machine with stitching threads; (c) inserting the stitching threads into the fibrous layer to form a pattern of spaced apart, interconnected rows of stitches, thereby creating the stitchbonded fabric; (d) removing the stitchbonded fabric from the stitchbonding machine; and (e) optionally subjecting the stitchbonded fabric to further textile finishing operations, such as shrinking, heat setting, molding, coating, impregnating and the like.

In a process of stitch bonding fabrics, a multiplicity of stitching yarns is passed repeatedly in stitching relation through one or more substrate layers in closely spaced rows, so as to form a coordinated arrangement of surface stitches in covering relation to the substrate. It is possible to use such stitchbonding techniques to form substantially uniform surfaces covered by the stitching yarns. It is also possible to impart patterns of stitching yarns across the surface by manipulation of the formation process. Such patterns may use substantially flat stitches, or optionally upstanding loops, or combinations thereof.

Stitchbonded nonwoven fabrics using stitching threads of fully drawn, flat and uncrimped crystalline polymeric yarns (also called "hard yarns") are known. Although the use of stitching threads of such yarns has been quite successful in many stitchbonded fabrics, such fabrics nonetheless have certain shortcomings. For example, such stitchbonded fabrics, although dimensionally stable, usually perform inadequately in molding or thermoforming operations, and also tend to unravel from the cut edges of a fabric, if they are submitted to washing or drying or rough handling.

Stitchbonded fabrics can also use textured bulkable yarns, typically of a polymeric material, containing filaments that have been drawn and set to cause or force the yarns to develop elastic spring-like crimp, as they shrink relative to their length. When these yarns are stitched onto a substrate while straightened under tension, and then the stitched fabric is released from stitching, the stitched yarns tend to relax back, re-develop the crimp, and in the cases of substrates that are thin or soft and easy to gather, they gather the stitched fabric, imparting bulk and a degree of elasticity to the stitched and gathered fabric. When the fabric is subjected to heat and/or humidity free of stress, as in the case of washing and drying, the textured bulkable yarns can develop sufficient shrinking power to cause a stitched fabric using relatively thin or soft substrates to gather significantly and develop relatively high levels of elastic stretch. The textured/bulkable yarns also develop filament crimp in-situ, within the fabric, which helps to hold the yarns in-place and allows the stitched fabrics to be subjected to multiple uses and multiple washings without unraveling.

Stitchbonded nonwoven fabrics can also include stitching threads of spandex elastomeric elastic yarns, which are capable of elongating and contracting in the range of 100 to 250%, allowing the production of stitchbonded fabrics with still higher levels of gather and stretch. The use of textured/bulkable yarns, and the use elastomeric yarns with or without accompanying textured or flat non-elastomeric threads, is disclosed in, for example, in U.S. Pat. Nos. 4,876,128, 4,773,238, 4,737,394 and 4,704,321 for making bulky and/or stretchy stitchbonded fabrics, in WO 94/19523 for making abrasion-resistant resin-impregnated stitchbonded fabrics, and in U.S. Pat. No. 5,308,674 for making tear-resistant stitchbonded fabrics, the disclosures of which are incorporated by reference. According to the processes disclosed in these patents, the stitchbonded fabric, immediately upon removal from the multi-needle stitching operation may be allowed to shrink and gather and develop elastic stretch. The development of these properties can be controlled by varying the yarn constructions and compositions, the weight and softness of the stitching substrates and the type of stitches used in the process.

Stitchbonded nonwoven fabrics can also include stitching threads or yarns that consist essentially of fibers or filaments of partially molecularly-oriented synthetic organic polymer. U.S. Pat. No. 6,407,018, the disclosure of which is incorporated by reference, describes a process that includes feeding a nonwoven fiber layer to a stitchbonding machine having at least one multi-needle stitching bar, threading a needle bar with stitching thread, inserting a pattern of stitches with the threaded multi-needle stitching bar into the nonwoven fiber layer to form the stitchbonded nonwoven fabric, and then optionally subjecting the stitchbonded nonwoven fabric to shrink the partially molecularly-oriented yarn, and gather the nonwoven fabric.

In the industrial laundry industry, cotton towels are laundered and rented to customers for the cleaning of kitchens, tables, walls, bar tops, and various other miscellaneous duties. The range of uses for the towels creates an environment where the product is subjected to much abuse. These towels are not ideal for all of these applications because of a lack of strength, propensity to lint, poor dimensional stability, and susceptibility to degradation from chlorine bleach. Degradation in the presence of chlorine is a particular problem with the longevity of the products because US DHEC (Department of Health and Environmental Control) regulations state that restaurants are required to soak their cleaning towels in a chlorine bleach solution for health reasons. Also, industrial laundries must bleach the towels heavily in the wash cycle to remove the tremendous loading of stains, grease, and particulate from the towels. For these reasons, the towels have a very short life span and are not as durable as the laundries or restaurants would prefer. The wear and abuse the towels endure also cause tears and holes in the product which is not desirable to restaurants and other customers because they look dirty and worn in front of their clients and project a poor image for the company.

US Publication 2007/0270071, the disclosure of which is incorporated by reference, teaches a nonwoven fabric towel containing 25 to 75% by weight a polyester or polyester co-polymer staple fiber having a staple length of between 3 and 6 inches, and 25 to 50% by weight a multi-segment splitable staple fiber comprising a polyester or polyester co-polymer component and a polyamide component. The nonwoven fabric towel is bonded with stitches of a bulkable yarn. The polyester fibers, polyester co-polymer staple fibers, or the multi-segment splittable staple fibers, have a hydrophilic surface treatment on the surfaces, to effect some improvement water absorption of the nonwoven towel for sopping up spills.

Notwithstanding the advancements in the field, there remains a need for a washable nonwoven fabric towel with excellent absorbency, durability, and cleanability, while having good hand.

SUMMARY OF THE INVENTION

The present invention provides a composite stitchbonded fabric, and more particularly a composite nonwoven stitchbonded fabric, that can be processed into a stitchbonded towel, which can be used and washed repeatedly under industrial laundering conditions, while retaining integrity, durability and good hand.

In an embodiment of the invention, a composite stitchbonded fabric comprises: a cellulosic nonwoven sheet comprising a nonwoven layer of cellulosic fibers along a technical front of the composite stitchbonded fabric; an integrated nonwoven sheet comprising an outer sublayer of wood pulp fibers and an inner sublayer of textile fibers, wherein the textile fibers of the inner sublayer are entangled with the wood pulp fibers of the outer sublayer to form the integrated nonwoven sheet, the inner sublayer of textile fibers confronts the cellulosic nonwoven sheet, and an outer surface of the outer sublayer of wood pulp fibers is along a technical back of the composite stitchbonded fabric; and a pattern of stitching yarns that fixes the cellulosic nonwoven sheet to the integrated nonwoven sheet, comprising a plurality of yarn overlaps on the technical front of the composite stitchbonded fabric, and a plurality of yarn underlaps on the technical back of the composite stitchbonded fabric.

In another embodiment, a composite stitchbonded fabric comprises a first nonwoven sheet comprising a nonwoven layer of cellulosic fibers, selected from the group consisting of textile-grade continuous cellulosic filaments, staple-length cut cellulosic fibers, and a combination thereof, located along the technical front (also known as the technical face) of the composite stitchbonded fabric, and an integrated nonwoven sheet comprising a sublayer of wood pulp fibers, and a sublayer of textile fibers, wherein the wood pulp fiber sublayer and the textile fiber sublayer of the integrated nonwoven sheet are inter-entangled to form an integrated nonwoven sheet structure. The outer sublayer of wood pulp fibers is located along the technical back of the composite stitchbonded fabric, and the inner sublayer of textile fiber confronts the inside surface of the cellulosic nonwoven sheet. The composite stitchbonded fabric uses one or more patterns of stitching yarns using a single-bar or two-bar, or three-bar system, that fix or tie the cellulosic nonwoven sheet to the integrated nonwoven sheet.

Preferably the fabric is stitched with at least two bars. Also preferably the patterns of stitching yarns comprise at least one pattern originating from a front-bar or a middle-bar or a back-bar, forming underlap yarns (underlaps) that connect the rows or wales of stitches in a zig-zag pattern, and partially cover and protect the exposed wood pulp sublayer of the integrated nonwoven sheet on the technical back of the composite nonwoven fabric, while the overlap yarns (overlaps) formed by the same bar and all other bars align within the parallel rows or wales of stitches exposed over the cellulosic nonwoven sheet along the technical front of the composite fabric. In selected embodiments, one or more of the stitching bars may form a linear pattern, such as a "chain" or "pillar" stitch, wherein the underlaps stay within the wales, but serve to reinforce the composite or to interlock with the yarns of the other bars. In other selected embodiments, one or more of the knitting bars may simply "lay-in" in a flat zig/zag layer of underlaps between wales on the technical back, held down by other stitching bar yarns that penetrate through. The laid-in or stitched-in underlaps protect the outer wood pulp sublayer. The laid-in yarn does not show at all on the technical front.

In an embodiment of the invention, the cellulosic fibers of the first nonwoven sheet can be selected from the group consisting of lyocell, rayon, and cotton, and other natural cellulosic materials, such as flax, hemp, jute, and ramie. In a further embodiment the cellulosic fibers are lyocell. Cotton and the other natural cellulosic fibers are provided in its natural staple form. The other cellulosic fibers, and particularly lyocell and rayon, can be in the form of textile-grade continuous filaments, or staple-length cut fiber, or a combination thereof.

In an embodiment of the invention, the first nonwoven sheet further comprises up to about 75% wood pulp fibers, preferably blended-in or attached to the inner side of the first nonwoven sheet of the cellulosic fibers, to avoid the direct and unprotected exposure of such wood pulp fibers between the wales on the technical back of the composite stitchbonded fabric.

In an embodiment of the invention, the integrated nonwoven sheet comprises a composite nonwoven sheet comprising a weight ratio of wood pulp fibers (in the outer sublayer) to textile fibers (in the inner sublayer) between about 1:3 to about 3:1 for example, a weight ratio of at least 1:2, for example, at least 1:1, and at least 2:1, and up to about 2:1, for example, up to about 1:1, and up to about 1:2. Typically, the content of the wood pulp fibers in the integrated nonwoven sheet is about 25-75% by weight, and the content of the textile fibers is about 25-75% by weight.

In an embodiment of the invention, the textile fibers of the inner sublayer of the integrated nonwoven sheet comprise polyester fibers. In another embodiment, the textile fibers of the inner sublayer comprise lyocell fibers. In another embodiment, the textile fibers of the inner sublayer comprise polylactic acid (PLA) or nylon fibers. In another embodiment, the textile fibers of the inner sublayer comprise a combination of two or more of polyester fibers, lyocell fibers, nylon, and PLA fibers.

In a non-limiting embodiment, a weight ratio of the polyester fibers, combined with other staple-length fibers, for example with lyocell fibers, or with PLA fibers, or with a combination of lyocell and PLA fibers, in the inner sublayer, is at least about 1:9, and up to about 9:1, for example, at least about 1:5, at least about 1:3, and at least about 1:2, for example, about 1:1, and up to about 5:1, up to about 3:1, and up to about 2:1. In a further non-limiting embodiment, the weight ratio of a combination of lyocell fibers and PLA fibers is at least about 1:9, and up to about 9:1, for example, at least about 1:5, at least about 1:3, and at least about 1:2, for example, about 1:1, and up to about 5:1, up to about 3:1, and up to about 2:1.

In an embodiment of the invention, the composite stitchbonded fabric has a cellulosic content of at least 25%, for example, at least 40%, at least 50%, at least 60%, and at least 70%, of the total weight of the nonwoven layers and sheets, where the cellulosic content is comprised from at least one or more of wood pulp fibers, lyocell fibers, PLA fibers, rayon fibers, and other cellulosic-based fibers. In an embodiment, the composite stitchbonded fabric has a high content of cellulosic-containing fibers, and includes a preponderance of cellulosic-containing fibers on the technical front and technical back of the stitchbonded fabric.

In a further embodiment of the invention, the composite stitchbonded fabric has a cellulosic content of at least 90%, for example, at least 95%, and at least 98%, and up to 100%, of the total weight of the nonwoven layers and sheets.

In one embodiment, the integrated nonwoven sheet is made by combining a web, sheet or layer comprising textile fibers, with a pre-formed layer or paper containing wood pulp fibers. The component fibers of wood pulp fibers and textile fibers are hydroentangled. In a particular embodiment, the web, sheet or layer comprising textile fibers is a continuous-filament spunbond/spunmelt polyester, polypropylene or nylon nonwoven fabric.

In an embodiment of the invention, the composite stitchbonded fabric further includes a third sheet disposed between the cellulosic nonwoven sheet and the integrated nonwoven sheet. The third sheet can comprise textile fibers, and can be a fibrous nonwoven sheet and a needle-punched felt. The third sheet can also be a film. The textile fibers of the third nonwoven sheet can comprise polyester fibers, lyocell fibers, PLA fibers, nylon fiber, or natural cellulosic materials, such as cotton, flax, hemp, jute, and ramie fibers, or a combination thereof.

In a further embodiment of the invention, the stitchbonded fabric is formed into a towel-sized fabric unit. In another or optional embodiment, the towel-sized fabric unit can include a stabilized boundary region along at least a portion of the periphery, including the entirety of the periphery.

The present invention also comprises a method for making the stitchbonded composite fabric described herein above.

In one embodiment, a method for making a composite stitchbonded fabric, comprising the steps of: providing a cellulosic nonwoven sheet comprising a nonwoven layer of textile cellulosic fibers; providing an integrated nonwoven sheet comprising an outer sublayer of wood pulp fibers and an inner sublayer of textile fibers, wherein the textile fibers of the inner sublayer are entangled with the wood pulp fibers of the outer sublayer to form the integrated nonwoven sheet, with the inner sublayer of textile fibers providing an inner surface of the integrated nonwoven sheet; placing the cellulosic nonwoven sheet over the inner surface of the integrated nonwoven sheet; and stitching the cellulosic nonwoven sheet to the integrated nonwoven sheet, to form a linear pattern of overlap wales on a technical front of the composite stitchbonded fabric aligned with the cellulosic nonwoven sheet, and a pattern of crisscrossing yarn underlaps on a technical back of the composite stitchbonded fabric aligned with the wood pulp sublayer of the outer sublayer of the integrated nonwoven sheet.

In another embodiment, a method for making a composite stitchbonded fabric comprises the steps of: a) providing a cellulosic nonwoven sheet comprising a nonwoven sheet of cellulosic fibers; b) providing an integrated nonwoven sheet comprising an outer sublayer of wood pulp fibers, and an inner sublayer of textile fibers defining an inside surface, wherein the textile fibers of the inner layer and the wood pulp fibers of the outer sublayer are inter-entangled to form the integrated nonwoven sheet, with the outer surface of the outer sublayer of the wood pulp fibers located along a technical back of the composite stitchbonded fabric; c) placing the cellulosic nonwoven sheet over the inner surface of the integrated nonwoven sheet; and d) stitching the cellulosic nonwoven sheet to the integrated nonwoven sheet, to form linear overlaps or wales on a technical front of the composite stitchbonded fabric, and a pattern of linear underlaps, or optionally linear and diagonal underlaps, alternating across wales along the technical back of the composite stitchbonded fabric.

In an embodiment of the invention, the fibers of the inner sublayer of the integrated nonwoven sheet comprise polyester fibers. In another embodiment, the fibers of the inner sub-layer can alternatively comprise lyocell fibers, or PLA fibers, or a combination of lyocell fibers, nylon fibers and PLA fibers. In another embodiment, the fibers of the inner layer comprise combinations of polyester fibers and one or more of lyocell fibers, nylon fibers, and PLA fibers.

In an embodiment of the invention, the method further includes placing a third sheet between the cellulosic nonwoven sheet and the integrated nonwoven sheet, before stitching. The third sheet comprises fibers, and can be a fibrous nonwoven sheet and a needle-punched felt. The third sheet can also be a film. The fibers of the third nonwoven sheet can comprise one or a combination of polyester fibers, lyocell fibers, nylon fibers, and PLA fibers, or other polymers or cellulosic-containing fibers.

In an embodiment of the invention, the method further includes forming the fabric into a plurality of towel-sized fabric units, and optionally forming a stabilized boundary region along at least a portion of a periphery or the entire periphery of the towel-sized fabric units.

In an embodiment of the invention, the stitching yarn can comprise one or more of a polyester yarn, a nylon yarn, a yarn of polylactic acid (PLA), a yarn of lyocell material, a yarn of other polymers, and a combination or mixture thereof.

In selected embodiments at least one of the knitting bars uses textured bulkable yarns deployed under tension. These yarns relax in-situ within the stitched fabric, thereby developing spring-like crimp, and locking the stitches within the fabric. They furthermore tend to gather the fabric in one or two directions. The textured bulkable yarns can be used exclusively or in combination with hard yarns or elastomeric yarns or partially-oriented yarns.

In an embodiment of the invention, the front-bar yarn comprises nylon yarn, and the back-bar yarn comprises polyester yarn. Alternatively, the front-bar yarn comprises polyester yarn, and the back-bar yarn comprises nylon yarn.

In another embodiment, the front-bar yarn and/or the back-bar yarn can comprise a partially-oriented or textured bulkable nylon yarn, and the back-bar yarn comprises a partially-oriented or textured bulkable polyester yarn.

In an alternative embodiment, the front-bar yarn comprises a partially-oriented or textured bulkable polyester yarn, and the back-bar yarn comprises a partially-oriented or textured bulkable nylon yarn.

In yet another embodiment, either the front- or the back-bar yarn, or both front- and the back-bar yarn, can include a combination of yarns comprising a polyester (or partially-oriented or textured bulkable polyester) yarn and a yarn comprising nylon (or partially-oriented or textured bulkable nylon) yarn.

In another embodiment, a portion of the front-bar yarn or the back-bar yarn, or a portion of both the front-bar yarn and the back-bar yarn, can comprise polylactic acid (PLA). The PLA yarn can be used in a partial or total replacement of a polyester yarn or nylon yarn, or both.

In another embodiment, a portion of the front-bar yarn or the back-bar yarn, or a portion of both the front-bar yarn and the back-bar yarn, can comprise lyocell yarn. The lyocell yarn can be used in a partial or total replacement of a polyester yarn or nylon yarn, or both.

In an embodiment of the invention, the method further includes a post-treatment of the plurality of towel-sized fabric units to form a plurality of stitchbonded washable towels, comprising the steps of: i) placing the towel-sized fabric units into a drum of a laundering apparatus; and ii) exposing the towel-sized fabric units to a heated aqueous solution having a temperature less than a temperature at which the partially-oriented or textured or bulkable yarns, which may include nylon and polyester filaments, become fully fixed, for a period of time sufficient to effect shrinkage and gathering of the towel-sized fabric units into stitchbonded washable towels.

In an embodiment of the invention, the heated aqueous solution has a temperature including and between about 125 and 200 degrees F. (52 and 93 degrees C.), and in a further embodiment, a temperature including and between about 175 and 185 degrees F. (79 and 85 degrees C.).

In an embodiment of the invention, the time sufficient to effect shrinkage and gathering is from about 5 minutes to about one hour.

In an embodiment of the invention, the heated aqueous solution comprises a soil release polymer, preferably at a level of about 0.05% to 3.0% by weight of the dry towel-sized fabric units. In a further embodiment, the soil release polymer comprises Pomoco 5962.

The present invention also comprises a stitchbonded washable towel. The towel can comprise a gathered, cellulosic nonwoven sheet comprising a nonwoven layer of cellulosic fibers along a front face of the towel, and a gathered, integrated nonwoven sheet comprising an outer sublayer of wood pulp fibers and an inner sublayer of textile fibers that have been substantially entangled with the wood pulp fibers of the outer sublayer, to form an integrated nonwoven sheet, with the inner sublayer of textile fibers confronting the cellulosic nonwoven face sheet, and the outer sublayer of the wood pulp fibers along a back face of the towel. The cellulosic nonwoven sheet and the integrated nonwoven back sheet are fixed and gathered together by a multiplicity of stitching yarns comprising a post-shrunken front-bar yarn and post-shrunken back-bar yarn. The cellulosic fibers, the textile fibers, and the stitching yarns are described herein above.

In an embodiment of the invention, the towel further includes a soil release polymer coated onto the surfaces of the fibers and the wood pulp.

DETAILED DESCRIPTION OF THE INVENTION

Definitions

Figure 1:
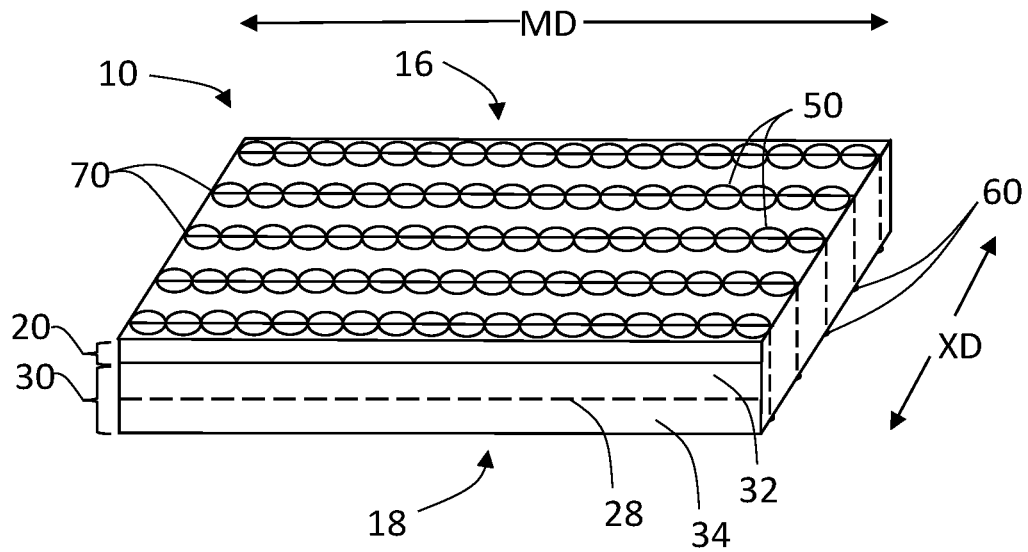
FIG. 1 shows a schematic illustration of an elongated sheet of a stitchbonded nonwoven fabric, formed by overlaying two sheets of nonwoven and stitchbonding the sheets together, showing the technical front of the fabric on top

As used herein, the terms "bulkable yarn", "textured yarn", "textured bulkable yarn" and "shrinkable" each refer to a spring-like thread or yarn that can be stitched under tension, and, when released, it can shrink back and develop crimp, also causing the stitchbonded fabric to be bulked or gathered by being deformed out-of-plane. The deformation property in a thread or yarn can be induced by well known means; one means includes releasing tension from the thread or yarn, or by exposing the thread to chemical action, moisture and/or heat at a temperature sufficient to cause shrinkage along the length, or width or both; for example, a temperature of about 50 to 200° C.

As used herein, the terms "calender" or "calendering" refers to a process for imparting surface effects onto fabrics or nonwoven webs. Without intending to be limiting, a fabric or nonwoven web may be calendered by passing the fabric or nonwoven web through two or more heavy rollers, sometimes heated, under high nip pressures.

As used herein, the terms "carding" or "carded web" refers to the process of opening and aligning staple fibers that are first formed as a thin combed layer, and optionally formed into a cross-lapped bulky web or bulky batt to produce generally uniform basis weight.

As used herein, the phrase "cellulosic fibers" refers to both textile-grade continuous filaments and staple-length cut fibers, unless mentioned or distinguished otherwise.

As used herein, the term "cross-lapped" means to spread a layer of combed loose fibers, or a warp of filaments or yarns, in a back and forth manner that is roughly transverse to the direction of the formation of the combed layer or warp, with the individual laps partially overlapping each other such that they form an acute angle with each other.

As used herein, a "filament" refers to a fiber that is formed into a substantially continuous trand.

As used herein, the terms "hydroentangle" or "hydroentangling" refers to a process by which a high velocity waterjet is forced through a web of fibers causing them to become randomly entangled. Hydroentanglement may also be used to impart images, patterns, or other surface effects to a nonwoven fabric by, for example, hydroentangling the fibers on a three-dimensional image transfer device such as that disclosed in U.S. Pat. No. 5,098,764 to Bassett et al, or aforaminous member such as that disclosed in U.S. Pat. No. 5,895,623 to Trokhan et al., both fully incorporated herein by reference.

As used herein, "needle punching" means to mechanically entangle a web of either non-bounded or loosely bounded fibers by passing barbed needles through the fiber web.

As used herein, the term "nonwoven sheet" means a web having a structure of individual fibers, yarns, or threads which are interlaid, but not in a regular or identifiable manner as in a woven or knitted fabric. Nonwoven fabrics or webs can be formed from many processes such as, for example, melt-blowing processes, spunbonding processes, air laying processes, and bonded carded web processes. Carded and needle-punched nonwoven webs are preferred for their good bulk and cushion. The nonwoven sheet can include one or more individual layers, typically bonded or integrated together.

As used herein, a "composite nonwoven fabric" means a fabric formed from one or more nonwoven sheets or layers.

As used herein, a "staple fiber" means a fiber of finite length. A staple fiber can be a natural fiber such as cotton, or a cut-fiber starting as a filament. A cut staple length used to form textile products by weaving, knitting, stitchbonding, carding, or forming staple-based "spun" yarns, is usually a "textile-grade staple" in the range of ⅜ to 5 inches (1 to 12.5 cm), more frequently in the range of ½ to 4 inches (1.2 to 10 cm). Shorter staple fibers are used to form reinforced papers when mixed with pulps and processed with special air-lay or wet-lay machines.

As used herein, the term "yarn" refers to a continuous, often plied, strand composed of either natural or man-made cut-staple fibers or man-made continuous filaments, used in weaving, knitting, stitchbonding, sewing, and other similar operations.

Composite Stitchbonded Fabric

Figure 2:
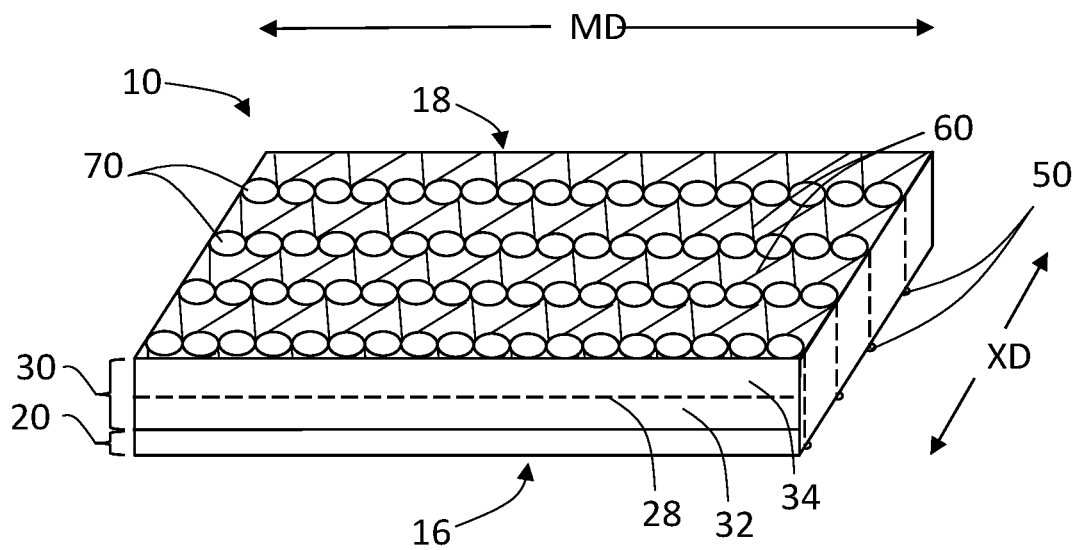
FIG. 2 shows a schematic illustration of the fabric of FIG. 1 with the technical back of the fabric on top.

Referring now to FIGS. 1 and 2, there is shown a composite stitchbonded fabric 10 that can be used as, for example, a cleaning towel. The composite stitchbonded fabric 10 includes a cellulosic nonwoven sheet 20 and an integrated nonwoven sheet 30. The cellulosic nonwoven sheet 20 and the integrated nonwoven sheet 30 are overlapped and tied or attached to each other with stitches of shrinkable yarns 40 comprising a pattern of overlaps 50 along the technical front 16 of the fabric, and a pattern of underlaps 60 on the wales along the technical back 18 of the fabric shown in FIG. 1. Some of the underlaps 60 bridge across the wales 70, while other underlaps 60 follow the wales depending upon the type of stitching pattern selected for each stitching bar. Each of the underlaps and overlaps originate from the same yarn that penetrates though layers 20 and 30, except for "laid-in" stitches that stay on the technical back side 18, held down by other yarns, originating from another bar, that go through both layers 20 and 30 along the wales 70.

Figure 3:
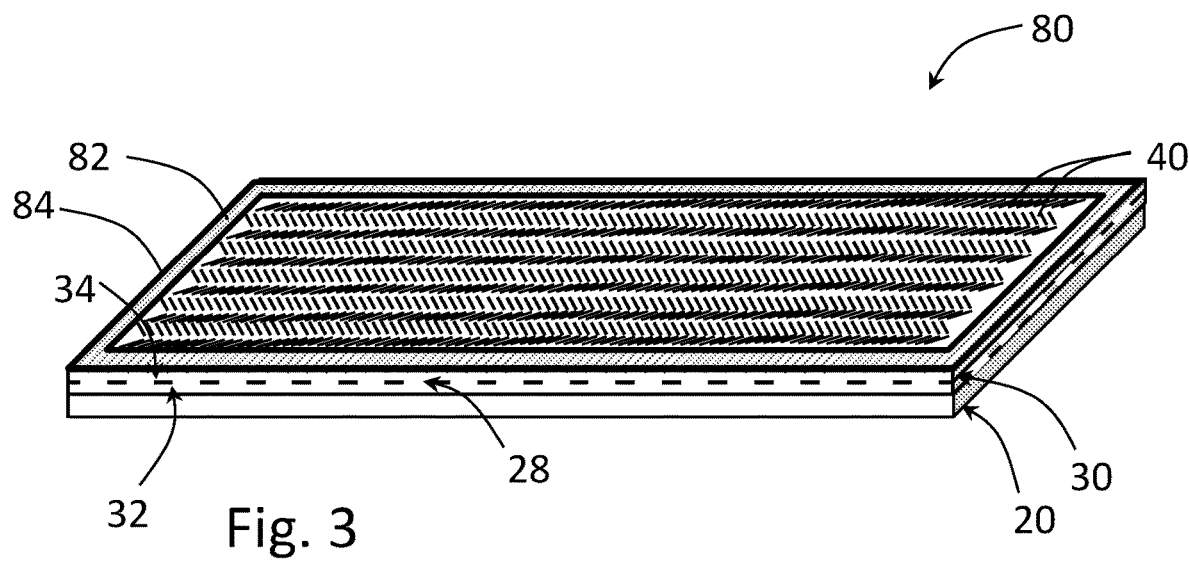
FIG. 3 illustrates a towel-size unit of the stitchbonded nonwoven fabric of FIGS. 1 and 2.

The composite stitchbonded fabric 10 can be formed into a towel-sized fabric unit 80, as shown in FIG. 3. The fabric unit 80 can be bonded together within a portion of a boundary region 82 at the periphery 84, in order to avoid fraying or tearing in subsequent use and repeated laundering. One or more of the four sides of the towel can be stabilized. Stabilization can be by means of stitching, such as serging, or by bonding by heat if the construction contains sufficient thermoplastic fiber content that can be heat fused. Fusing can be accomplished by any means that imparts sufficient heat and pressure in a localized area to create a durable bond. Processes such as hot press fusing, ultrasonic fusing, radio frequency fusing, or other heat and pressure producing processes can be used. A preferred process uses heat fusing on the two ends of the towel unit that follow the cross-machine direction from stitchbonding. Ultrasonic bonding is the preferred method.

Figure 4:
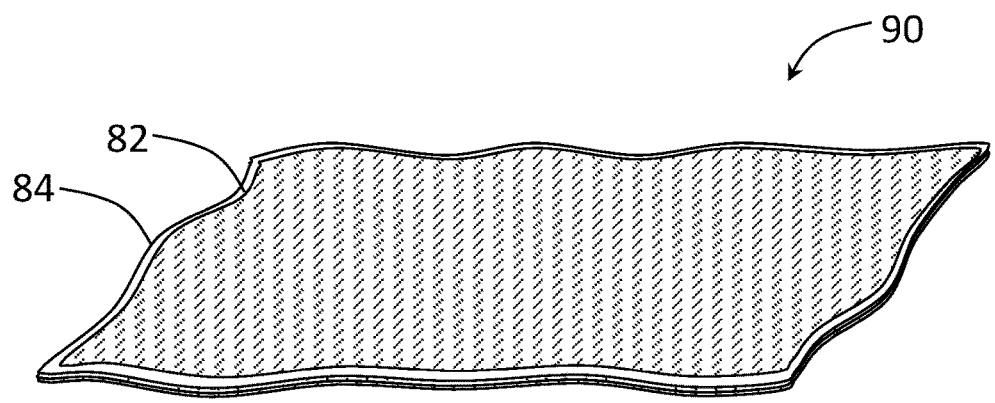
FIG. 4 illustrates a gathered stitchbonded towel formed after a post-treatment of the towel-size unit of FIG. 3.

The resulting stitchbonded washable towel 90 has excellent absorbency and durability, and can have improved stain resistance, while having good hand. The towel-sized fabric unit 80 that can be further treated to form into a stitchbonded washable towel 90, as shown in FIG. 4.

The cellulosic nonwoven sheet 20 can comprise lyocell fibers. Lyocell is a manmade fiber derived from cellulose, better known in the United States under the brand name Tencel®. Though it is related to rayon, another cellulosic fabric, lyocell is created by a solvent spinning technique, and the cellulose undergoes no significant chemical change. In an embodiment of the invention, the cellulosic nonwoven sheet 20 comprises about 75%-100% lyocell fibers, and optionally up to 25%, or up to 50%, or up to 75%, wood pulp fibers. A layer of lyocell fibers can be produced using an air laid machine inline, a carding machine inline or offline with prebonding via hydroentangling. The inter-entangling of the sheet of lyocell fibers and optional wood pulp fibers with can be done by well-known means, commonly referred to as hydroentangling or spunlacing. The lyocell fibers have a length no less than 8 mm, preferably 8 to 100 mm, and most preferably 8 mm to 40 mm. In a preferred embodiment, the lyocell on the open face has a fiber length greater than 18 mm, which provides both good coverage and stability for the structure.

The lyocell fibers of the cellulosic nonwoven sheet can also be in the form of continuous filaments, especially if they are hydraulically entangled with wood pulp fiber, stabilizing the sheet.

The basis weight of the lyocell fiber web is typically from about 0.5 to 5.0 ounces per square yard (ozsy) (about 17-170 grams per square meter, or gsm), more particularly in the range of about 1-3 ozsy (34-100 gsm). An embodiment uses a 100% lyocell nonwoven sheet having a basis weight of 1.6 ozsy (54 gsm).

The integrated nonwoven sheet 30 comprises an outer sublayer of wood pulp fibers integrated with an inner sublayer of textile fibers, and has a weight ratio of wood pulp fibers to textile fibers of about 1:3 to about 3:1. Typically, the content of the wood pulp fibers is about 25-75% by weight, and the content of the textile fibers is about 25-75% by weight. Other integrated nonwoven sheets can comprise a weight ratio of wood pulp fibers to textile fibers of at least 1:2, for example, at least 1:1, and at least 2:1, and up to about 2:1, for example, up to about 1:1, and up to about 1:2.

The basis weight of the composite stitchbonded fabric is typically from about 2 to 10 ounces per square yard (ozsy) (about 70-340 grams per square meter, or gsm), for a composite stitchbonded fabric having a thickness of about 1 mm to 5 mm. A typical embodiment of the composite stitchbonded fabric has basis weight of about 4.6 ozsy (156 gsm).

In one embodiment, the textile fibers can comprise continuous or staple-length fibers. In another embodiment the textile fibers of the composite nonwoven sheet 30 comprise polyester fibers, described hereinafter in detail. In an alternative embodiment, the textile fibers of the composite nonwoven sheet 30 can comprise lyocell fibers, substantially as described herein above, instead of polyester fibers, or in a combination or fiber mixture with polyester fibers.

In another alternative embodiment, the inner sublayer of textile fibers can comprise PLA fibers, alone or in a combination or fiber mixture with polyester fibers and/or lyocell fibers. The PLA fibers have a length no less than 5 mm, preferably 8 to 100 mm, and most preferably 8 mm to 40 mm.

In one embodiment, the integrated nonwoven sheet 30 is made by entangling continuous polyester fibers comprised in a continuous filament polyester spunbond/spunmelt fabric (polyester fabric) 32, with sublayer 34 web comprising wood pulp fibers. The inner surface of the inner sublayer of the composite nonwoven sheet 30, facing the cellulosic nonwoven sheet 20, is comprised of the polyester fabric sublayer 32. The outer surface of the integrated nonwoven sheet 30 is comprised of the wood pulp web sublayer 34.

The inter-entangling of the wood pulp fibers of sublayer 34 with the polyester fibers (or other textile fibers) of sublayer 32 can be done by well-known means, including hydroentangling as described, for example, in U.S. Pat. No. 6,516,502, the disclosure of which is incorporated by reference. The sublayer 34 of wood pulp fibers can be produced using an air-lay machine inline, or offline with prebonding via hydroentangling, or it can be introduced as a paper produced in a wet-lay machine. The layer 34 can contain 100% wood pulp fibers, or a blend of wood pulp fibers with other natural cellulosic fibers, for example cotton, flax, hemp, jute, and ramie. The wood pulp layer 34 and the polyester fabric 32 have an intermediate interface 28, across which wood pulp fibers from the web layer 34 can blend into and with the polyester fibers of the polyester fabric 32, and the polyester fibers of the polyester fabric 32 can blend into and with the wood pulp fibers from the web layer 34. In other words the intermediate interface 28 can comprise a gradient of a blend of polyester fibers and wood pulp fibers. Processes for hydroentangling the respective fibers of two or more overlapping fiber sheets are well-known, and include those described in U.S. Pat. No. 9,394,637, and US Patent Publications 2016/0228337 and 2017/0203542, the disclosures of which are incorporated by reference in their entirety.

The basis weight of the integrated nonwoven sheet is typically from about 0.5 to 5.0 ounces per square yard (ozsy) (about 17-170 grams per square meter, or gsm), more particularly in the range of about 2-4 ozsy (68-135 gsm). An embodiment can use a 55/45 weight blend of wood pulp fibers and polyester fibers, having a basis weight of 2.6 ozsy (88 gsm).

The length of the wood pulp fibers is preferably at least about 1.5 mm, and typically no more than about 5 mm, and preferably about 2.5 mm to 3.5 mm, with a diameter ranging from about 15 microns to about 40 microns. Other natural cellulose fiber may be employed in combination with wood pulp fiber, such as pulped rayon fibers. In one embodiment a wood pulp can be a southern pine Kraft or obtained from a sulfite pulping process. Mixtures of natural cellulose fibers may be used. The natural cellulose fibers may be pulped in hammermills to form a mixture of fine individual loose fibers. In general, very fine powderized fibers are avoided, or kept at a very low percentage level.

The length of the polyester (textile) fibers is no less than 5 mm, and typically are at least 8 mm, for example, at least 10 mm, for example, at least 15 mm, at least 20 mm, and at least 25 mm, and up to about 50 mm or more, for example, up to about 40 mm, up to about 35 mm, and up to about 25 mm. They can also be continuous filaments.

In an embodiment of the invention, the composite stitchbonded fabric can optionally comprise a third sheet, comprising one or more additional films, a needle-punched felt, or a fibrous nonwoven sheet, for example, a third nonwoven sheet. The material of the fibers or the film of the third nonwoven sheet can be selected from among polyester and its co-polymers, and polypropylene, for example, polyethylene terephthalate (PET), polytrimethylene terephthalate (PTT), polycyclohexane dimethylene terephthalate (PCT), polybutylene terephthalate (PBT), and PET modified with polyethylene glycol (PEG). In an alternative embodiment, the third nonwoven sheet can include cellulosic fibers, selected from one or more of lyocell fibers, PLA fibers, and rayon fibers. In a preferred embodiment, the third nonwoven layer comprises polyester fibers, and is disposed between the cellulosic nonwoven sheet and the integrated nonwoven sheet, before stitching.

Suitable bulkable or shrinkable yarns typically comprise a plurality of filaments. They may comprise a one or combination of a textured, DTY (draw textured yarn), SDY (spun drawn yarn), POY (partially oriented yarn), FOY (fully oriented yarn), threads or yarns of a polymeric material. The polymeric material can include polyester, nylon, and functionally equivalent polymers, and composite yarns can be an elastomeric yarn (for example, elastomerics such as Lastol-P® available from Dow's XLA generic or high temperature Lycra®) in an extended state, wrapped with inelastic nylon or polyester.

Bulking of the bulkable yarns (a) increases entanglement of the yarns with the fibrous material of the cellulosic nonwoven sheets 20 and the integrated nonwoven sheet 30, and enhances the fabric stability and durability, and (b) causes gathering of the towel-sized fabric 80, which results in a stitchbonded washable towel 90 with a softer hand, improved drape, and decreased stiffness.

Conventional nonwoven fabrics containing a sheet of staple fibers, and especially of polyester fibers, have the tendency to abrade or pill with washing and wearing of the fabric. Conventional means to minimize abrading and pilling have included bonding of the polyester fibers with resins or through thermal stabilization. Without being bound by any particular theory, the present invention places the textile fiber sublayer 32 of polyester fibers of the integrated nonwoven sheet 30, between the sublayer 34 of wood pulp fibers, to which the textile fiber sublayer 32 is hydroentangled, and the cellulosic nonwoven sheet 20 of cellulosic fibers, which protects the polyester fibers from exposure at the outer surface(s) of the composite stitchbonded fabric 10 to minimize and prevent abrading and pilling of the polyester fibers in the sublayer 32.

Further, the entangling of the polyester fibers of the textile fiber sublayer 32 with the wood pulp fibers of sublayer 34 is believed to stabilize and anchor the wood pulp fibers. The parallel, tight rows of yarn underlaps 60 overlay the wood pulp fibers on the technical back 18 of the fabric 10, confining and protecting the exposed wood pulp fibers. The combination of the parallel, tight rows or wales 70 of stitching yarns, along with the entangling of the bulked yarns with the polyester fibers within sublayer 32 protects and maintains the structure of the fabric through multiple industrial washings of the towel.

Method for Making a Composite Stitchbonded Fabric

The present invention also includes a method for making the composite stitchbonded fabric.

First, a cellulosic nonwoven sheet and an integrated nonwoven sheet are provided for overlaying and stitching. The cellulosic nonwoven sheet comprises the nonwoven layer of cellulosic fibers, typically lyocell staple fibers. The integrated nonwoven sheet comprises the outer sublayer of wood pulp fibers and the inner sublayer of textile fibers, for example, polyester fibers, with the wood pulp fibers heavily entangled with the textile fibers.

The cellulosic nonwoven sheet is placed over the inner surface of the integrated nonwoven sheet, typically by overlapping the inner sublayer of the integrated nonwoven sheet, by well-known means.

The overlapping sheets are stitched together into a nonwoven fabric. In one embodiment, the stitch bonding is made in a stitching pattern that can include, but not be limited to, a Tricot pattern, or a 3- or 4-row Atlas pattern. The row spacing between wales 70 in the cross-machine XD direction, commonly referred to as "gauge", is in the range of 5 to 25 rows per inch (2 to 10 rows per centimeter), while the course stitch spacing in the course or machine MD direction (commonly referred to as "course per inch" or "CPI", is in the range of 5 to 38 stitches per inch (2 to 15 stitches per centimeter). In a preferred embodiment, the row spacing between wales is about 14 or more rows per inch (6 rows per centimeter), while the course stitch spacing is about 7 or more stitches per inch (3 stitches per centimeter).

The stitching patterns in a stitchbonding machine mirror those of a warp knitting machine. Examples of stitching patterns are illustrated in "Investigation of the Two-Bar Warp-Knitted Fabric Structure Effect on Luster Value", Saeed Ajeli, Journal of Engineered Fibers and Fabrics, Vol 9, Issue 2, 2014, pp 32-37, the disclosure of which is incorporated by reference. Stitching techniques and parameters can also be used as described in U.S. Pat. Nos. 5,308,673 and 5,902,757, the disclosures of which are incorporated by reference.

The selection of the yarns for the stitching process has an effect on the properties of the stitchbonded fabric and, following any post-treatment and shrinkage control, the properties of the finished washable towel. In an embodiment of the invention, the yarns are selected to provide a shrinkage performance from a post-treating process of at least 16%, and typically at least 18%, and more typically at least 20%, in the machine direction (MD) and a growth of less than 10% in the cross-machine direction (XD) (See FIG. 1), to convert the composite stitchbonded fabric into a stitchbonded washable towel with good appearance and hand.

While both a nylon yarn and a polyester yarn will shrink when exposed to heat in the post-treating process, the extent and endpoint of shrinkage between polyester and nylon can differ. When using polyester in both bars, the degree of shrinkage is less than desired, and may create a towel with the desired aesthetic. But when using nylon in both bars, the shrinkage may continue at a rate greater than desired, at each subsequent laundering step of the towel, defined as a net area shrinkage of more than 8% after 25 washes.

Consequently, using one bar of nylon and one bar of polyester, a controllable shrinkage of the composite stitchbonded fabrics produces a stitchbonded washable towel with good properties. In one embodiment, the front-bar yarn can comprise a partially-oriented nylon yarn, while the back-bar yarn comprises a partially-oriented polyester yarn. In another embodiment, the front-bar yarn can comprise a partially-oriented polyester yarn, while the back-bar yarn comprises a partially-oriented nylon yarn.

When combining the two or more nonwoven sheets or substrates, each greater than 1.0 ounce per square yard, using a stitch-bonding machine with a gauge 14 or greater, and 7 courses per inch or more effective shrinkage control is achieved. Good shrinkage control is considered as a net area shrinkage of less than 8%, after a 25-wash test.

While other synthetic yarns such as polypropylene can provide an acceptable stitchbond structure, the increased oleophilic content contributed by such synthetic yarns to the fabric increases the difficulty with which cooking oils can be removed from the structure in subsequent washing and cleaning.

Post-Treatment and Sizing

The present invention also includes a method for post-treating a towel-sized stitchbonded fabric into a stitchbonded washable towel. More particularly, the post-treatment process or method includes a treatment of the plurality of towel-sized fabric units, after they have been stitchbonded, to form a plurality of washable, stitchbonded towels.

The composite stitchbonded fabric is cut to towel-size and stitched or sealed along at least a portion of the periphery, such as along one side, opposed sideds, and both opposed sides, to form a stable boundary. A preferred method simultaneously cuts and bonds (forms the boundary) using an ultrasonic device. In one embodiment, the stitchbonded fabric 10 can be slit into the individual towel units 80 and stitched along the periphery 84 with a stitching yarn. In an alternative embodiment, a pattern of outer boundary regions 82 of the stitchbonded fabric 10 can be ultrasonically sealed in the pattern, and slit within the outer boundary regions 82 into individual towel units 80. With ultrasonic slitting, the towel-sized fabrics 80 may can is cut and sealed in one step.

The method further comprises the steps of placing a plurality of the towel-sized fabric units 80 into a drum of a laundering apparatus, such as an industrial rotary washer. The plurality of the towel-sized fabric units are exposed for a controlled amount of time to a heated aqueous solution having a controlled temperature sufficient to cause the nylon yarns and the polyester yarns to shrink to a desired extent. Physical agitation of the towel-sized fabrics aids in the sizing process. The fabric units are exposed for the time sufficient to cause gathering of the fabric into the towel. The ratio of water solution to the weight of towel-sized fabric units (stitchbonded fabrics) is typically between 2:1 to about 10:1, depending on the type of machine and mechanical parameters. The time sufficient to cause the nylon yarns and the polyester yarn to shrink is from about 5 minutes to about one hour, again depending on the type of machine and mechanical parameters. For example, a typical time can be time of 1 minute to 20 minutes, at a temperature including and between 150 degrees F. to 205 degrees F. (66 to 96 degrees C.). Preferably, the temperature of the heated aqueous solution at which the towel-sized fabric units are exposed, is lower than a temperature at which the nylon and polyester filaments become fully fixed. This allows the yarns of the stitchbonded towel to have some degree or amount of stretch and "give" (flexibility) after treatment, and during subsequent uses and wash cycles. The temperature of the heated aqueous solution is well over the conventional industrial laundering wash water temperature, or the temperature to be employed for subsequent laundering of the towels of the present invention.

After the exposure of the fabric units to the heated aqueous solution, the fabric units are drained and rinsed in one or more lower-temperature baths, to cool the treated and pre-shrunk towels to a suitable temperature for unloading of the machine and mitigating any creasing that may occur if the heated towels are left uncooled.

In one embodiment, the heated aqueous solution has a temperature of about 125 to 200 degrees F. (52 to 93 degrees C.). Solution temperatures in this range are sufficient to effect partial curing of the polymeric yarns, but less than a temperature at which the polymeric yarns can become fully cured. Temperatures at or above 225 degrees F. (107 degrees C.) generally should be avoided for most polymer yarns. Typically, the time sufficient to cause the nylon yarn and the polyester yarn to shrink is from about 5 minutes to about one hour. In combination, depending on the polymer of the yarn, the temperature of the heated aqueous solution, and the time duration for pre-treatment, a towel having any desired degree of polymer curing, and hence shrinkage and gathering, and extensibility during use.

In another embodiment of the invention, the heated aqueous solution can comprise a soil release polymer agent, preferably at an active level of about 0.03% to 3.0% by weight of the dry towel-sized fabric units, and in a typical embodiment, about 0.1 to 0.6% by weight of the dry towel-sized fabric units. A suitable soil release polymer agent provides protection from the re-deposition of soils in the first and early wash cycles onto the fibers and fabric, including the polyester, nylon, and cellulosic fibers, of the stitchbonded washable towel. The soil release polymer included in the heated aqueous solution provides to the freshly-manufactured towel a resistance to redeposition of accumulated soils in the washing solution, typically from other soiled fabrics in a washing cycle, onto the stitchbonded towel, including onto the substantial amount of nylon and polyester stitching yarn in the washable towel.

Examples of suitable soil release polymers (SRP) agents are low molecular weight, hydrophilic polyester polymers. These types of compounds are used in the textile industry as semi-permanent soil release compounds on polyester fabrics, as oil scavengers in scouring and dyeing of synthetic fiber textile fabrics (especially polyester knits), and as softeners and lubricants for polyester textile fabrics. Such SRP agents are known to be used in laundry detergent formulations, where their effect in assisting soil removal is expected to build up slowly over repeated washings.

The SRP agents of the present invention can include nonionic soil release agents having oxyethylene hydrophiles, for example, the condensation polymers of polyethylene glycol and/or ethylene oxide addition products of acids, amines, phenols and alcohols which may be monofunctional or polyfunctional, together with binder molecules capable of reacting with the hydroxyl groups of compounds with a poly (oxyalkylene) chain, for example, organic acids and esters, isocyanates, compounds with N-methyl and N-methoxy groups, bisepoxides, etc. Particularly useful are the condensation products of dimethyl terephthalate, ethylene glycol and polyethylene glycol (ethoxylated polyester) and ethoxylated polyamides, especially ethoxylated polyesters and polyamides having a molecular weight of at least 500, as well as soil release agents described in the following patents, the disclosures of which are incorporated herein by reference: U.S. Pat. Nos. 3,416,952, 3,660,010, 3,676,052, 3,981,807, 3,625,754, 4,014,857, 4,207,071, 4,290,765, 4,068,035 and 4,937,277. Combinations of anionic soil release agents with oxyethylene hydrophile condensates, such as are generally referred to as sulfonated ethoxylated polyesters and soil release agents are disclosed in the following patents: U.S. Pat. Nos. 3,649,165, 4,073,993, and 4,427,557, the disclosures of which are incorporated herein by reference. Additional hydrophilic treatments may be found in U.S. Pat. No. 7,012,033, incorporated herein by reference.

A non-limiting example of a soil release polymer is Pomoco 5962 (CAS Number 9016-88-0), available from Piedmont Chemical Industries. This polymer has been found to be surprisingly effective in preventing re-deposition soiling, including on the cellulosic portions of the nonwoven washable towels of the invention, showing a significant improvement in the cleanliness, whiteness, and residual odor, when towels treated this way are washed conventionally with cotton bar towels.

In another aspect of the invention, the use of the hydrophilic SRP agent in a pre-treatment of the washable towel, effects a surface on the polyester fibers and yarns that is more wettable by water, to improve the absorbency and wicking performance of the nonwoven washable towel is not impaired and is in some cases enhanced, relative to the washable towel without SRP agent treatment or conventional bar towels. When the pre-treated washable towel has been dried following the pre-treatment with SRP agent, the dried towel is softer and more flexible, and less paper-like, than conventional towels having comparable quantities and types of cellulosic fibers.

In another embodiment of the method, a temperature of the heated aqueous solution containing the SRP agent is maintained in a range between about 175 and 185 degrees F. (79 and 85 degrees C.), in order to partially fix a portion of the SRP agent in the heated aqueous solution to the fibers and yarns of the washable towel, where the affixed SRP agent remains through the rinse and drying cycles. The resulting washable towel is then used in ordinary cleaning duty, and when washed for the first time with other soiled towels, the residual affixed SRP agent improves the release of accumulated soils and stains, and helps prevent re-deposition of soils and stains from the wash solution onto the cleaned, washable towel.

Without being bound by any particular theory, it is believed that the soil release polymer agent that is applied to the fabric in the pre-treating process allows the SRP agent to be retained sufficiently to the fabrics to serve as a barrier to staining under normal use. However, at the proper laundering conditions, including wash solution temperature and washing agents, the retained SRP agents can be substantially removed from the fabrics in the subsequent wash process, to assist in freeing soils from the towel surface and creating an enhanced cleaning effect under less rigorous washing conditions.

Washable Towels

Employing the composite stitchbonded fabric and the post-treating process described herein, the present invention provides a stitchbonded washable towel. The towel comprises a gathered, cellulosic nonwoven sheet along the technical front or face of the fabric, and a gathered, integrated nonwoven sheet along the technical back of the fabric. The gathered component sheets of the stitchbonded washable towel are integrated together with a multiplicity of stitching yarns comprising overlaps on the technical front and underlaps on the technical back, to fix and gather the cellulosic nonwoven face sheet to the integrated nonwoven back sheet.

In another embodiment of the invention, the fibers or sheets of the stitchbonded washable towel further include soil release polymer coated in the pre-treating process, onto the surfaces of at least one of, and typically all of, the fibers.

In one embodiment, the stitchbonded fabric, and the stitchbonded washable towel formed therefrom, has a density of between 150 and 300 grams per square meter, creating a lightweight towel with good absorption and physical durability. In specific embodiments, the stitchbonded washable towel of the invention can be specifically described in terms of durability of the towel. The desired durability is typically established based on, among other things, the application where the towel is intended to be used or the number of washes the fabric should be capable of sustaining. For example, in certain embodiments of the invention, the nonwoven fabric will be capable of sustaining at least 1 wash, at least 2 washes, at least 3 washes, at least 5 washes, at least 7 washes, at least 10 washes, at least 15 washes, at least 20 washes, at least 25 washes, at least 30 washes, at least 35 washes, at least 40 washes, at least 45 washes, or at least 50 washes under temperature, detergent solution, bleaching, and abrasive action conditions according to AATCC (American Association of Textile Chemists and Colorists) 61 wash test standard 4A for laundering. The durability of the towel can mean that the towel can continue to be used in the intended application(s) and undergoes numerous washes with no substantial change in the structural integrity of the fabric of the towel (no raveling and resistant to hole formation), maintaining its stronger tensile strength, with little or no pilling on the surface of the towel, and with good hand and appearance, even under industrial laundering conditions. In another embodiment, the durable towel successfully undergoes multiple washes, with the towel substantially maintaining the ability to continue to be used in the application(s) for which it was intended, even after undergoing one or more washes.

The stitchbonded washable towel preferably has an absorbency of aqueous solutions of at least 400% by weight of the towel. Additionally, the towel preferably has a stoll flat abrasion results of greater than 500 cycles after 30 industrial washes as tested by ASTM D3886-99.

Preferably, the towel 90 has durability to commercial laundering. After 30 industrial washes, the nonwoven towel preferably has a tongue tear strength of at least 10 lb-f as tested by ASTM2261. Additionally, the towel 90 preferably has a grab tensile strength of at least 50 lb-f as tested by ASTM D5034, and a sled friction of greater than 0.15 as tested by ASTM D1894 (friction is desired for picking up kitchen objects such as pots and pans) after 30 industrial washes. In one embodiment, the towel 90 has a tongue tear of at least 10 lb-f in the warp and weft directions after being subjected to a chlorine test consisting of a series of 2 industrial washes and dryings and an overnight soaking in a 5% bleach solution repeated 5 times. Additionally, the towel 90 preferably has a tensile strength of at least 50 lb-f (pound force) in the warp and weft directions after the after the chlorine test washes.

The stitchbonded washable towels of the invention may be used as towels, sport towels, salon towels, automotive and transportation wash towels, retail bath towels, cabinet roll towels, bar-mops, restaurant cleaning towels, industrial and commercial cleaning towels, table skirting, table pads, and pharmaceutical and chemical absorbent.

Washable towels made in accordance with the present invention provide better performance in cleaning and absorbing, with a lighter weight of towel. The towel provides a better or cleaner surface (less linting), while absorbing more liquid due to better absorbency and wicking, typically absorbing about twice as much water per weight of towel compared to terry towels.

The washable towel also can also be used to clean the "front of the house", including tables, glassware, windows, and bar tops. This eliminates any need for a second type of towel, for example, a disposable towel or microfiber towel, for cleaning these surfaces. And the washable towel provides these benefits despite its light weight than a conventional towel, which improves the laundering efficiency in a laundry plant. The lower towel weight allows more towels per load to be washed and dried per cycle (about 30% to 60% more), resulting in lower direct cleaning cost per towel, and higher productivity of the plant.

Examples

A. Stitchbonded Fabric Making

A continuous nonwoven sheet of 100% lyocell fibers (sourced from Norfin (USA) LLC and selected from among a 1.6 oz product reference 02440, or a 2.4 oz product reference 02441) was overlaid onto an inner face of a continuous integrated nonwoven sheet consisting of an outer nonwoven layer of wood pulp fibers and an inner nonwoven layer of polyester fibers that have been heavily entangled with the wood pulp fibers (sourced from Jacob Holm and selected from 2.0 oz product reference 8801, 2.6 oz product reference 8890, and 3.6 oz product reference 8805). The overlapping nonwoven sheets were stitched together into a stitchbonded nonwoven fabric, using a two-bar stitching system comprising a front-bar yarn of polyester textured, bulkable filament yarn (75 den/36), and back-bar yarn of textured, bulkable nylon filament yarn (70 den/40). The stitching pattern was selected from among a chain or pillar pattern, a Tricot pattern, or a 3- or 4-Row Atlas pattern, with a row spacing or gauge of about 14 rows per inch, and a stitch spacing or CPI of about 7 stitches per inch. The fabric was slit into towel-size fabric units, and stabilized at the boundary.

B. Towel Shrinkage and Post-Treatment

In a standard industrial laundry machine, the wash drum was loaded with a desired weight of dry stitchbonded, towel-sized fabric units. The machine was operated throughout at the rotational speed and direction as dictated by the machine. Water was added into the machine to a desired level, and an 0.6% of Pomoco 5962 SRP agent, by weight of the dry stitchbonded towel-sized fabrics, was added to the water solution. The water solution was then heated to 185 degrees F. (85 degrees C.) and held for 15 minutes with agitation.

The heated water solution was drained and the machine filled to the desired level with warm water (for example, including and between 120-140 degrees F. (49-60 degrees C.)) and held for 5 minutes with agitation.

The warm water was drained and the machine filled to the desired level with cold water (e.g., 70 degrees F. (21 degrees C.)). After five minutes, the cold water was drained and residual bulk water was removed from the wet load of towels by spinning.

The damp, pre-treated towels were removed from the drum and dried in a tumble dryer.

It is intended that the scope of the present invention include all modifications that incorporate its principal design features, and that the scope and limitations of the present invention are to be determined by the scope of the appended claims and their equivalents. It also should be understood, therefore, that the inventive concepts herein described are interchangeable and/or they can be used together in still other permutations of the present invention, and that other modifications and substitutions will be apparent to those skilled in the art from the foregoing description of the preferred embodiments without departing from the spirit or scope of the present invention.

The invention claimed is:

1. A stitchbonded washable towel that is durable to multiple cycles of commercial laundering and use, comprising:
   i) a gathered cellulosic nonwoven face sheet comprising a nonwoven layer of cellulosic fibers comprising lyocell fibers, wherein the lyocell fibers are located along the technical front;
   ii) a gathered integrated nonwoven back sheet comprising an outer sublayer of wood pulp fibers and an inner sublayer of textile fibers that are entangled with the wood pulp fibers of the outer sublayer, with the inner sublayer of textile fibers confronting the gathered cellulosic nonwoven face sheet, and an outer surface of the outer sublayer of wood pulp fibers is along a technical back of the stitchbonded washable towel; and
   iii) a pattern of stitches of one or more shrinkable shrunken stitching yarns, which fix and, when released, gather the gathered cellulosic nonwoven face sheet to the gathered integrated nonwoven back sheet, wherein the pattern of stitches of the one or more shrinkable stitching yarns form a plurality of yarn overlaps on the gathered cellulosic nonwoven face sheet and at least one set of yarn underlaps on the gathered integrated nonwoven back sheet that bridge across one or more stitched wales over the outer sublayer of wood pulp fibers.

2. The stitchbonded washable towel according to claim 1, wherein a surface of the textile fibers is coated with a soil release polymer.

3. The stitchbonded washable towel according to claim 1, wherein the cellulosic fibers of the gathered cellulosic nonwoven face sheet further comprise up to about 25% wood pulp fibers by weight that have been inter-entangled with the lyocell fibers.

4. The stitchbonded washable towel according to claim 2, wherein the soil release polymer comprises a polymer of CAS 9016-88-0.

5. The stitchbonded washable towel according to claim 1, wherein the yarn overlaps comprise partially-oriented nylon and the yarn underlaps comprise partially-oriented polyester.

6. The stitchbonded washable towel according to claim 1, wherein the yarn overlaps comprise partially-oriented polyester and the yarn underlaps comprise partially-oriented nylon.

7. The stitchbonded washable towel according to claim 1, wherein the textile fibers comprise polyester fibers, and the integrated nonwoven sheet comprises about 25-75% by weight wood pulp fibers and about 25-75% by weight polyester fibers.

8. The stitchbonded washable towel according to claim 1, wherein the cellulosic fibers of the cellulosic nonwoven sheet consist of lyocell fibers.

9. The stitchbonded washable towel according to claim 1, wherein the cellulosic nonwoven sheet further comprises other cellulosic fibers selected from the group consisting of rayon, cotton, flax, hemp, jute and ramie, and a mixture or combination thereof.

10. The stitchbonded washable towel according to claim 1, wherein the shrinkable stitching yarn is selected from the group consisting of a partially-oriented polymeric material and an elastomeric yarn component.

11. The stitchbonded washable towel according to claim 10, wherein the partially-oriented polymeric material is selected from the group consisting of partially-oriented polyester, partially-oriented nylon, and a combination or a mixture thereof.

12. The stitchbonded washable towel according to claim 1, further including a gathered third sheet, disposed between the gathered cellulosic nonwoven face sheet and the gathered integrated nonwoven back sheet.

13. The stitchbonded washable towel according to claim 12, wherein the gathered third sheet is a fibrous sheet.

14. The stitchbonded washable towel according to claim 1, wherein the stitchbonded washable towel consists of the gathered cellulosic nonwoven face sheet, the gathered integrated nonwoven back sheet, an optional gathered third sheet disposed between the gathered cellulosic nonwoven face sheet and the gathered integrated nonwoven back sheet, the pattern of stitches of the one or more shrinkable shrunken stitching yarns, and optionally a soil release polymer coated onto the surfaces of at least the textile fibers.

* * * * *